Jan. 5, 1960     R. S. BEACHY     2,919,675
POULTRY FEEDER
Filed Aug. 25, 1958
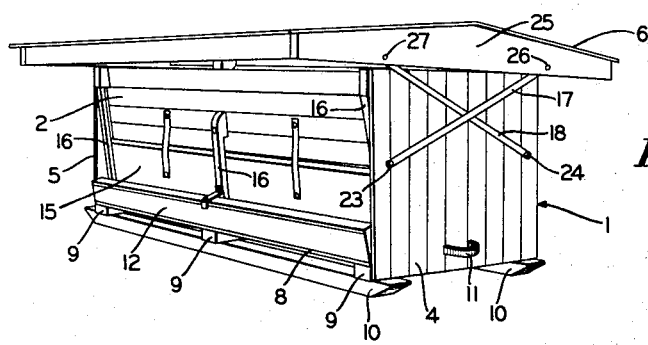
Fig.1
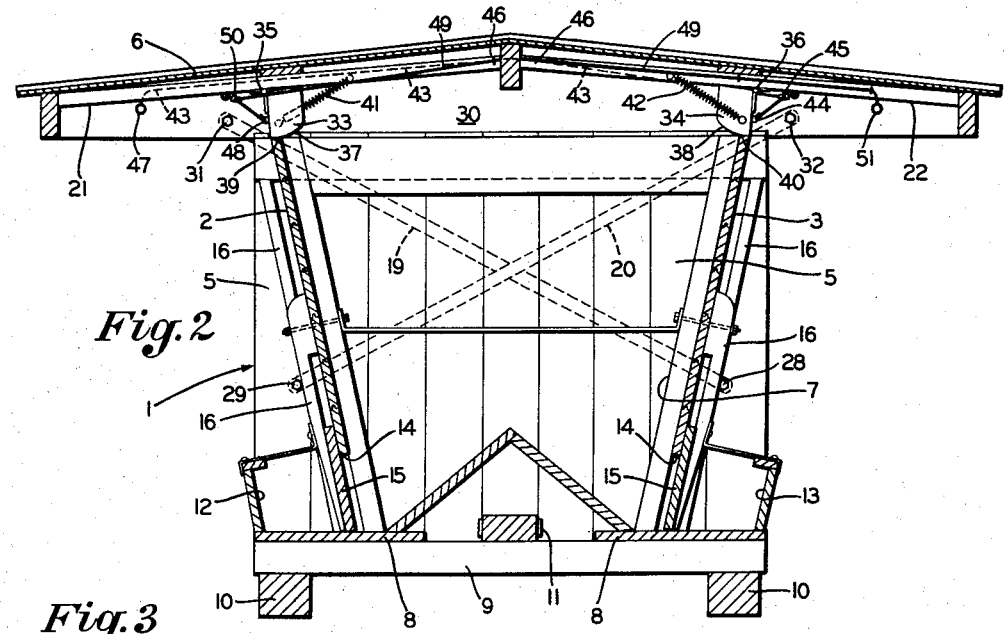
Fig.2
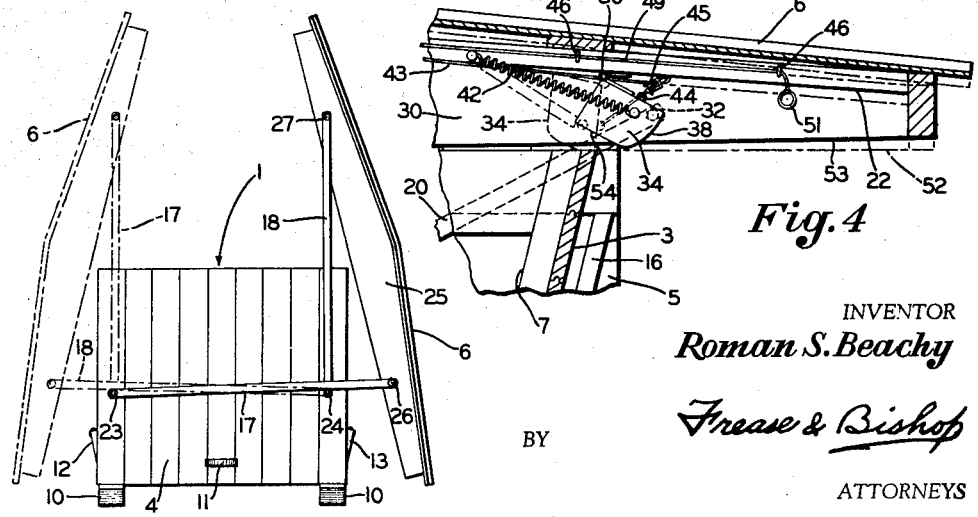
Fig.3
Fig.4
INVENTOR
Roman S. Beachy
BY Frease & Bishop
ATTORNEYS

United States Patent Office 2,919,675
Patented Jan. 5, 1960

2,919,675

POULTRY FEEDER

Roman S. Beachy, Sugarcreek, Ohio

Application August 25, 1958, Serial No. 756,855

4 Claims. (Cl. 119—52)

This invention relates to a poultry feeder.

Various poultry feeders have been used in the past but have been unsuitable for several reasons. For one reason the feeders have been inconvenient because they have been difficult to fill with feed. A primary disadvantage contributing to the inconvenience of filling has been that most prior feeders have been provided with roofs or covers which have opened from only one side of the feeder. Where the feeder is relatively wide and has a cover which opens on one side only, it has been difficult to fill both sides of the feeder from one side only.

For another reason some prior feeders have been unsatisfactory because the roofs or covers have been too easily removed from their closed position. Normally a feeder is provided with a roof or cover having a wide overhang which is coextensive with the length of the hoppers on opposite sides and thereby protects the feed troughs from the rain. A disadvantage of a roof having wide overhangs is that it is susceptible to strong winds which lift the roof or cover from its normally closed position. It is therefore desirable to provide a locking means for the cover which prevents its removal except when intentionally removed for filling or maintaining the hopper.

Other reasons include the non-portability of prior poultry feeders as well as the lack of hitching means for moving the feeder from one location to another.

The poultry feeder of the present invention includes a removable roof or cover having wide overhangs coextensive with the feed troughs on opposite sides of the feeder. The cover is provided with a locking block on each side so that the roof or cover can be opened in either direction only when the locking blocks for the particular side is disengaged from the locking position. Accordingly, the roof cannot be removed from its protective position by undesirable means such as strong winds or tampering.

It is a general object of this invention to provide a poultry feeder having a roof which is open from either side of the feeder.

It is another object of the invention to provide a poultry feeder which has a removable cover conducive to easy filling and maintenance.

It is another object of the invention to provide a poultry feeder having locking blocks mounted between each side and the roof for unlocking the roof when necessary to open the same for access to the hopper.

Finally, it is an object of this invention to provide an improved poultry feeder which accomplishes the foregoing objects and desiderata in a simple, effective, and inexpensive manner.

These and other objects and advantages apparent to those skilled in the art from the following description and claims may be obtained, the stated results achieved, and the described difficulties overcome by the discoveries, principles, apparatus, parts, combinations, subcombinations, and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claims forming part thereof.

The nature of the improved apparatus of the present invention may be stated in general terms as including a base, spaced upright side walls and spaced upright end walls forming a hopper, a trough coextensive with the lower edge of each side wall and communicative with the hopper, a cover removably mounted at the top of the hopper and having overhanged portions extending above the troughs on opposite sides thereof, means for pivotally mounting the cover in place and for rotatively removing the cover from the closed to opened positions on either side of the hopper, said means including a first pair of connecting links at each pivotally mounted respectively on one end wall of the hopper, the links being inclined upwardly across each other and having their other ends pivotally mounted on the cover at locations outside of the side walls, said means also including a second pair of links mounted and arranged at the other end of the hopper in a manner corresponding to the first pair of links, and a locking block hingedly mounted on the undersurface of the cover at each side wall, each block being movable between positions of abutment and nonabutment with the upper edge of the respective side wall, and means for rotating each block for its abutment position to permit opening of the cover from the closed position at the top of the hopper.

By way of example a preferred embodiment of the apparatus of the present invention is shown in the accompanying drawing wherein:

Fig. 1 is a perspective view of the poultry feeder showing the cover in the closed position;

Fig. 2 is a vertical sectional view through the poultry feeder;

Fig. 3 is an end view of the poultry feeder showing the cover open on one side and showing the cover closed in broken lines on the other side; and Fig. 4 is an enlarged fragmentary view showing the locking block in the open position.

Similar numerals refer to similar parts throughout the various figures of the drawing.

In Fig. 1, a poultry feeder is generally indicated at 1. It includes two spaced side walls 2 and 3 (Fig. 2), two spaced end walls 4 and 5 (Fig. 2), and a roof or cover 6. The walls 2, 3, 4 and 5 form a hopper 7 for receiving and storing feed for poultry.

Beneath the hopper is a bottom wall 8 which is supported by spaced cross members 9 which extend between a pair of parallel skids or runners 10 whereby the hopper feeder 1 may be pulled over ground from one place to another by a hitch 11.

As shown in Fig. 2, the side walls 2 and 3 are spaced upright members extending substantially at an angle to the bottom wall 8. At the lower edge of the side wall 2 a feed trough 12 is provided which is coextensive with the length of the feeder extending from opposite end walls 4 and 5. A similar feed trough 13 is provided at the lower edge of the side wall 3. The troughs communicate with the hopper 7 through similar openings 14 along the lower edge of the side walls 2 and 3, which openings are provided with similar gates 15 for closing the openings 14. The gates 15 are retained in place by spaced slide brackets 16 which are secured to the side walls 2 and 3 in a conventional manner such as by bolts to permit raising and lowering the openings 14.

The roof or cover 6 is secured on top of the feeder where it is supported primarily on a pair of links 17 and 18 on the end wall 4 and by another pair of links 19 and 20 (Fig. 2) on the end wall 5. Each pair of links 17 and 18, 19 and 20, is normally disposed in an X-arrangement when the cover 6 is closed. The roof or cover 6 includes overhang portions 21 and 22 which extend respectively from the side walls 2 and 3 over the troughs 12 and 13. The lower ends of the links 17 and 18 are pivotally secured at 23 and 24 respectively on the end wall 4 and the upper ends of the links are pivotally secured to an end member 25 of the roof at pivot points 26 and 27 respectively. In a similar manner, as shown in Fig. 2, the links 19 and 20 are pivotally mounted at 28 and 29 at their lower ends on the end wall 5. Likewise, the upper ends of the links 19 and 20 are pivoted on an end member 30 of the cover 6 at pivot points 31 and 32.

The upper pivot points 26, 27, 31, and 32 of the links 17, 18, 19, and 20 are located laterally outwardly of the upper edges of the side walls 2 and 3. This is necessary because the links 17, 18, 19, and 20 guide and support the cover during lifting and rotating from the closed to the open positions on either side of the feeder 1. The links constitute radius arms for rotation of the cover and provide clearance between the cover and the upper edges of the end walls 2 and 3 for which reason it is necessary that the upper pivot points 26, 27, 31, and 32 be located outside of the end walls. For example, when the cover 6 is turned from the closed position of Fig. 1 to the open position on the right side wall 3, as shown in Fig. 3, the link 17 moves from the inclined position of Fig. 1 to the substantially horizontal position of Fig. 3 rotating about the pivot point 23 until the link 17 comes to rest upon the extended pivot point 24. In order for the cover 6 to clear the upper end of the side wall 3, the link 17 must be of sufficient length that all portions of the cover 6 clear the upper edge of the side wall 3 during the rotation to the position of Fig. 3. Simultaneously, the link 18 rotates upwardly from the inclined position of Fig. 1 to the substantially vertical position of Fig. 3 and thereby supports the upper edge of the cover 6 in the open position. When the cover 6 is open to the left side, as viewed in Fig. 3, the lines 17 and 18 reverse their positions so that the link 18 is in the lowermost, substantially horizontal, position and resting upon the pivot pin 23. The links 19 and 20 at the end 5 of the feeder operate in a manner corresponding to the links 17 and 18 and in co-operation therewith.

To prevent the cover 6 from being opened from the closed position either accidentally or by tampering, the cover is provided with two lock blocks 33 and 34, which are disposed at the upper ends of the side walls 2 and 3, respectively. The block 33 is mounted on a hinge 35 on the undersurface of the cover 6 and likewise the block 34 is mounted on a hinge 36. The blocks 33 and 34 include arcuate ends 37 and 38, respectively. When the cover 6 is properly disposed on top of the feeder 1, the blocks 33 and 34 are in abutment at 39 and 40 with the upper edges of the side walls 2 and 3 and thereby provide additional support for the cover in co-operation with the links 17, 18, 19, and 20. The blocks 33 are retained in the blocking positions shown in Fig. 2 by springs 41 and 42, respectively, which have one end secured to the block and the other end secured to the cover 6.

When it is necessary to raise the cover 6 to the position on the right side, as viewed in Fig. 3, the block 34 is rotated about the hinge 36 from the abutment position 40 with the upper edge of the side wall 3. For that purpose, means as provided for rotating the block against the tension of the spring 42, which means includes a cable 43, one end of which is secured by an eye 44 on the outer side of the block 34. The cable 43 extends through a pulley 45 secured to the undersurface of the cover and across the undersurface of the roof through a number of eyes 46 to the side of the cover opposite that of the block 34 where a ring 47 is secured to the other end of the cable 43. Likewise, the block 33 is provided with an eye 48 for the attachment of a cable 49 which extends through a pulley 50 and across the under side of the cover 6 through eyes 46 to the opposite side of the cover from the block 33 as a pull ring 51 is disposed.

Accordingly, when the cover 6 is to be lifted from the closed position to the position on the right side of the feeder as shown in Fig. 3, the operator approaches the feeder from the left side, engages the pull ring 47 and simultaneously depresses the left side of the cover slightly whereby the right side of the cover is raised from the closed position, as indicated by the broken line 52, to a slightly elevated position 53 so that the block 34 is raised out of abutment with the upper edge of the side wall 3. The block 34 may be readily pulled against the spring 42 to a non-blocking position (Fig. 4) where the arcuate end 38 is moved out of proximity to the upper edge of side wall 3 and a straight side 54 faces said edge at a spaced distance therefrom. The block 34 is then in an inoperative, non-abutting position and the left side of the cover 6 may be raised and moved to the right side until the links 17 and 20 come to rest upon the pivot points 24 and 28, respectively, of the links 18 and 19. Thereafter, the cable 43 is released and the spring returns the block 34 to its normal position.

When the cover 6 is returned to the closed position, the arcuate edge 38 of the block 34 facilitates the return of the block to the abutment position 40 with the upper edge of the side wall 3.

If the cover 6 is opened to the left side (Fig. 3), a procedure similar to that described above for opening to the right side is followed.

The device of the present invention thus avoids prior art difficulties. The roof or cover opens to either side in a smooth and easy manner. At the same time there are means including lock blocks to support and maintain the cover in place in the closed position except when the blocks are intentionally removed.

Finally, the crossed pairs of links at opposite ends of the feeder serve to support the roof and provide means as radius arms for properly rotating the cover between the opened and closed positions.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the features, constructions and principles of the invention, the characteristics of the poultry feeder and the advantageous, new and useful results provided; the new and useful discoveries, principles, parts, elements, combinations, subcombinations, structures and arrangements, and mechanical equivalents obvious to those skilled in the art are set forth in the appended claims.

I claim:

1. A poultry feeder including a hopper having opposite side walls and end walls, a cover detachably mounted on the hopper, the cover having an overhang extending outwardly from each side wall, a first pair of links pivotally mounted on one end wall and extending upwardly and across each other to the cover, the upper ends of the links being respectively pivotally secured to the cover at locations outside of the side walls, a second pair of links mounted and arranged at the other end of the hopper in a manner corresponding to the first pair of links, and means for locking the cover on the hopper including a locking block movable between positions of abutment and non-abutment with the upper edge of each side wall.

2. A poultry feeder including a hopper having opposite side walls and end walls, a removable cover on the hopper, the cover having overhang portions extending outwardly from the side walls, a first pair of links pivotally mounted on one end wall and extending upwardly and across each other to and being pivotally mounted on the cover, a second pair of links pivotally mounted on the other end wall and extending upwardly and across each other to and being pivotally mounted on the cover, the cover being movable from a closed position on the top of the hopper to open positions on either side thereof, and means for locking the cover on the hopper including a locking block hingedly mounted on the cover and movable between positions of abutment and non-abutment with the upper edge of each side wall.

3. The construction set forth in claim 2 in which the locking blocks are spring biased in the positions of abutment with the respective side walls.

4. The construction set forth in claim 3 in which cable means are provided for moving the blocks separately to non-abutment positions to permit tilting of the cover from the closed to the opened positions.

References Cited in the file of this patent

UNITED STATES PATENTS 2,090,414     Haapalakso _____ Aug. 7, 1937